United States Patent
Karaoglu et al.

(10) Patent No.: US 6,495,245 B1
(45) Date of Patent: Dec. 17, 2002

(54) HAND WRAP MULTILAYER FILM PRODUCTS

(75) Inventors: Azmi Karaoglu, Wayne, NJ (US); Dennis J. Kalz, Danville, VA (US)

(73) Assignee: Intertape, Inc., Danville, VA (US)

( * ) Notice: Subject to any disclaimer, the term of this patent is extended or adjusted under 35 U.S.C. 154(b) by 212 days.

(21) Appl. No.: 09/584,066

(22) Filed: May 31, 2000

Related U.S. Application Data

(60) Provisional application No. 60/166,689, filed on Nov. 20, 1999.

(51) Int. Cl.$^7$ ................................................ B32B 27/32
(52) U.S. Cl. ........................................ 428/213; 428/516
(58) Field of Search ................................ 428/515, 516, 428/213

(56) References Cited

U.S. PATENT DOCUMENTS

| | | | | |
|---|---|---|---|---|
| 4,430,457 A | * | 2/1984 | Dobreski | 523/100 |
| 4,833,024 A | | 5/1989 | Mueller | 428/349 |
| 4,865,902 A | | 9/1989 | Golike et al. | 428/215 |
| 5,023,143 A | | 6/1991 | Nelson | 428/516 |
| 5,334,428 A | * | 8/1994 | Dobreski et al. | 156/244.11 |
| 5,902,684 A | * | 5/1999 | Bullard et al. | 428/515 |
| 5,907,942 A | | 6/1999 | Eichbauer | 53/441 |
| 5,907,943 A | | 6/1999 | Eichbauer | 53/441 |
| 5,976,682 A | * | 11/1999 | Eichbauer | 428/213 |
| 6,159,587 A | * | 12/2000 | Perdomi | 428/213 |
| 6,265,055 B1 | * | 7/2001 | Simpson et al. | 428/213 |
| 6,299,968 B1 | * | 10/2001 | Karaoglu et al. | 428/213 |

\* cited by examiner

*Primary Examiner*—D. Lawrence Tarazano
(74) *Attorney, Agent, or Firm*—Roberts Abokhair & Mardula, LLC

(57) ABSTRACT

The present invention provides improved multi-layer hand wrap stretch film products. The products comprise at least five layers. The first and second outer layers each represent from 4 to 13 percent by weight of the film and each comprises a blend of two different linear low density polyethylene products. The film includes a first and second inner layer where each represents from 20 to 40 percent by weight of the film and comprises linear low density polyethylene products. The core layer represents from 10 to 30 percent by weight of the film and comprises linear low density polyethylene products. The final film exhibits improved properties needed in hand wrap films such as puncture resistance and load retention. Preferably, each of the outer layers comprises a blend of linear low density-polyethylene hexene/copolymers and linear low density-polyethylene/butene copolymers. The same linear low density-polyethylene/butene copolymer may be utilized in each of the layers. In one process, the first and second inner layers are drawn from an extruder at a faster rate than the core layer and the outer layers.

12 Claims, No Drawings

# HAND WRAP MULTILAYER FILM PRODUCTS

RELATED APPLICATIONS

This application claims priority from provisional patent application No. 60/166,689 filed on Nov. 20, 1999, by Azmi Karaoglu (Kay). The provisional application is incorporated herein by reference, in its entirety, for all purposes.

BACKGROUND

The present invention is directed to stretch wrap films and methods for their use. In particular, the present invention is directed to stretch wrap films having good physical properties in maximum stretch, holding force, puncture resistance, total energy dart drop, cling force and overall strength. The films of the present invention are particularly useful in hand wrapping applications.

The use of thermoplastic stretch wrap films for the overwrap packaging of goods, and in particular, the unitizing of palleted loads is a significant commercially important application of polymer film, including generically, polyethylene and other polyolefins.

Over-wrapping a plurality of articles to provide a unitized load can be achieved by a variety of techniques. In addition to machine wrapping, these products are utilized in hand wrapping operations. Pallets can be hand wrapped quickly, safely and economically. Hand wrapping is particularly useful in wrapping irregular or non-uniform pallets and articles. Hand wrap films exhibit toughness sufficient to hold the article. The industry also utilizes narrow width hand wrap films. These offer an alternative to adhesive based wrapping films, tape, twine, strapping or glue. The hand wrap films need to exhibit good cling force, but only to the film itself and not to the wrapped article. The hand wrap operations offer affordable, easy to use means of keeping loads clean, damage free and safe from pilferage. The hand wrap films should also exhibit good puncture and tear resistance.

Hand wrapping large pallets is finding acceptance in industry today. In this method, the film is arranged on a roll, however, it is hand held by the operator who walks around the goods to be wrapped, applying the film to the goods. The operator may install the roll of film so used on a hand-held wrapping tool for ease of use.

Some of the properties desired of a good stretch wrap film for hand wrapping are as follows: good cling or cohesion properties, puncture resistance, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Currently, different grades of stretch wrap films are commonly marketed for different end uses according to overall film properties. For example, certain stretch wrap films have superior properties for load retention, but these films are characterized by having poor stretching characteristics. On the other hand, certain stretch wrap films having superior stretching properties have low load retention properties, thus limiting their use. Some of the broader categories include: general-purpose hand wrap films, heavy duty hand wrap films, and special formulation hand wrap films.

A need exists to develop general-purpose hand wrap stretch films. These films exhibit good properties at an acceptable cost that is usually lower than the other premium or specialty grades. The target for this grade is to maximize the film surface per amount of polymer used. The film still must exhibit the desirable physical properties outlined above. These films are particularly suitable for a wide range of hand wrap applications including general load unitization, use in long range load hauling, bar code scanning, and other shipping requirements. The products should provide good load retention characteristics and stretching characteristics while still maintaining other important stretch film properties.

Accordingly, the present invention provides for multi-layer films for hand wrap stretch film applications. The preferred resultant film has five layers with each layer being a single component or a blend of components to achieve the desired improved results.

In accordance with the present invention, attention has been focused on developing general-purpose hand wrap stretch films, while maintaining cost efficient production capabilities. Performance enhancements include improvement of load retention, tear resistance in machine direction (MD) and transverse direction (TD), puncture resistance, ultimate elongation, and overall strength. Desired properties of a "good" hand wrap stretch film are good cling or cohesion properties, good tear resistance in MD and TD directions, good clarity (low haze), high ultimate elongation, high tensile values, good stiffness (modulus), and high yield per pound.

SUMMARY

The present invention is directed to co-extruded films comprised of at least 5-layers construction that are used for hand wrap film applications. In one embodiment, these multi-layer stretch wrap films are manufactured as cast films with conventional co-extrusion methods. Each of the five layers comprises a single polyolefin polymer or a mixture of polymers. When a mixture of polymers is utilized in a single layer, the polymers are introduced into an extruder to be mixed and extruded as a single layer. In one embodiment, the multi-layer film comprises a first outer layer, a first inner layer, a core layer, a second inner layer and a second outer layer. The first outer layer represents from 4 to 15 percent by weight of the film and comprises a blend of two different linear low-density polyethylene products. A first inner layer represents from 20 to 40 percent by weight of the film and comprises linear low-density polyethylene products. A core layer represents from 10 to 30 percent by weight of the film and comprises linear low density polyethylene products. A second inner layer represents from 20 to 40 percent by weight of the film and comprises linear low density polyethylene products. A second outer layer represents from 4 to 15 percent by weight of the film and comprises a blend of two different linear low density polyethylene products. The inner layers may comprise the same LLDPE composition as the core layer. The core layer is preferably extruded at a slower rate than the inner layers.

In another five layer film product of the present invention, each of the outer layers represents from 4 to 15 percent by weight of the film and each comprises a blend of 60 to 90 percent by weight of a first linear low density polyethylene product, and 10 to 40 percent by weight of a second different linear low density polyethylene product.

Another embodiment of the present invention provides a multi-layer film comprising two outer layers, two inner layers and a core layer. A first outer layer represents from 5 to 12 percent by weight of the film and comprises a blend of 70 to 80 percent by weight of linear low density-polyethylene/hexene copolymers, and from 20 to 30 percent by weight of linear low density-polyethylene/butene copolymers. A first inner layer represents from 30 to 35 percent by weight of the film and comprises linear low density-polyethylene butene/copolymers. A core layer represents from 15 to 20 percent by weight of the film and comprises a linear low density-polyethylene/butene copolymer products. A second inner layer represents from 30 to 35 percent by weight of the film and comprises linear low density-polyethylene/butene copolymer products. A second outer layer represents from 5 to 12 percent by weight of the film and comprises a blend of 70 to 80 percent by weight of linear low density-polyethylene/hexene copolymer products and 20 to 30 percent by weight of linear low density-polyethylene/butene copolymer products. Preferably, the linear low density-polyethylene/butene copolymer in each layer is the same polymer. Such a polymer has a melt index from 1.7 to 2.3 g/10 min. and a density of from 0.915 to 0.9198 grams per cubic centimeter.

DETAILED DESCRIPTION

The film products of the present invention provide improved general purpose hand wrap stretch film for load containment or product protection. Such films are utilized in various applications for hand wrapping products. Hand wrapping provides more flexibility and is less costly than machine wrapping. For example, hand wrapping films are utilized in the floor covering and tile industry. Carpet remnants are rolled and wrapped with hand wrap films instead of tape or cordage. The hand wrap films are cleaner to use and the wrap retains product visibility while eliminating possible damage or residue from adhesive tape. The non-porous film clings to itself and can be written on with a marker with no danger of the ink bleeding through. The film is also utilized to secure shipping labels and, unlike tape, retains its strength and flexibility without yellowing over time. Removal of the film is quick and simple and does not require the use of a knife or cutter. Such films are also used to hand wrap pallets of various shapes, tiles, paper products, phone books for delivery, and the like. Since the film adheres only to itself, the removal of the film does not leave adhesive residue or marred finishes. Removal of the film will not tear off the printed surface of a package.

These films are usually manufactured in a cast film process and cover a wide range of applications. The applications include general load unitization, long-range load hauling, and bar code scanning applications. The films of the present invention provide products with quiet unwind characteristics and effective load containment over a wide range of prestretch levels.

In one embodiment of the present invention, the film comprises five layers where each of the five layers comprises a single type of polyolefin polymer or a mixture of various polymers as shown in the table below. When a mixture of polymers is utilized in a single layer, the polymers are introduced into an extruder to be mixed and extruded as a single layer. The general purpose hand wrap stretch film construction comprises the utilization of five layers of the following compositions. Each of the outer layers comprises a blend of two linear low density polyethylene products. The second outer layer comprises linear low density polyethylene (LLDPE) products. These outer layers are present in the final film product in amounts ranging from 10 to 25 percent by weight total or from 5 to 12.5 percent by weight each. Each of the inner layers (not the core layer) comprises LLDPE products and represents from about 20 to about 40 percent by weight of the total film. The core layer comprises LLDPE and is present in an amount from 10 to 30 percent by weight of the final film product.

TABLE I

| Layer | Amount (wt %) | Make-up |
|-------|---------------|---------|
| A | 10%–25% | LLDPE-1, LLDPE-2 |
| B | 20%–40% | LLDPE |
| C | 10%–30% | LLDPE |
| B | 20%–40% | LLDPE |
| A | 10%–25% | LLDPE-1, LLDPE-2 |

In one embodiment of the invention, the outer layer A comprises a blend of two different LLDPE products, herein referred to as LLDPE-1 and LTDPE-2. Suitable LLDPE-1 products are linear low density-polyethylene/hexene copolymers having a density of from 0.915 to 0.9198 grams per cubic centimeter (g/cm$^3$) and a melt index of 1.5 to 2.5 (g/10 min.). Most preferably, the LLDPE-1 products have a melt index of from 1.72 to 2.28 g/10 min. and a density of 0.916 to 0.918. These LLPE-1 products are preferably present in amounts ranging from 60 to 90 percent by weight and preferably from 70 to 80 percent of the outer layer. Such products are available from various vendors including Exxon Chemical (Escorene® LL-3002) and Union Carbide Corporation (Tuflin® HS-7002). These products are utilized in the blend of the outer layer to provide good tensile properties as well as stiffness and toughness to the resulting film product.

The second LLDPE component (LLDPE-2) is selected from LLDPE products that are linear low density-polyethylene/butene copolymers. Preferably, such products have a melt index of from 1.5 to 2.5 g/10 min. and a density of from about 0.916 to 0.9198. Such products are available from various vendors. For example, Exxon product Escorene LL-1002.32 is suitable for this application. This product has a target melt index of 2.0 g/10 min., density of 0.918 g/cc and a melting point of 249° F. (121° C.). This second LLDPE component is present in the outer layer in amounts ranging from about 10 to 40 percent by weight of the outer layer. Preferably, the LLDPE-2 component is present in an amount of from 20 to 30 percent by weight of the outer layer. This component provides good tensile and toughness properties with good draw down capability, thus permitting down gauging.

In one preferred embodiment, the various components of the outer layers are present in the following amounts: LLDPE-1 represents 60–70 percent, and LLDPE-2 represents 20–30 percent. In a most preferred embodiment, the amounts are 75% of LLDPE-1, and 25% of A-LLDPE-2.

The inner layers, shown as layers B in the table above, comprise linear low density polyethylene (LLDPE) products. Each of the inner layers B represents about 20 to 40 percent by weight of the total film. Most preferably, each of the inner layers represents 30–35% by weight of the total film.

The LLDPE component is selected from the same class of the LLDPE-2 component of the outer layer A. This product is preferably the same product as used in the outer layers for the LLDPE-2 component.

The core layer comprises LLDPE products selected from the products suitable for use in the LLDPE-2 component of the outer layers. Preferably, such products have a melt index of from 1.5 to 2.5 g/10 min. and a density of from about 0.916 to 0.9198. Such products are available from various vendors. For example, Exxon product Escorene LL-1002 is suitable for this application. This product has a target melt index of 2.0 g/10 min., density of 0.918 g/cc and a melting point of 249° F. (121° C.). The core layer represents from 10 to 30, preferably from 15 to 20 percent by weight of the total film.

In the five layer film construction, in accordance with an embodiment of the present invention, the outer layers can be the same or different. When the outer layers are the same, the layer designation is shown as A-B-C-B-A. This also shows that the inner layers B are the same. Alternatively, the outer layers may be different with the layer designation shown as A-B-C-B-D. Layer D can vary but comprises the same classes of components as in layer A In another embodiment of the present invention, layers B may be the same or different. Layers B may be different but preferably should comprise the same types of components. In such a case film designation is A-$B_1$-C-$B_2$-A or A-$B_1$-C-$B_2$-D. In yet another preferred embodiment, the same LLDPE/butene copolymer component is used in all layers. In another preferred embodiment, each layer comprises a minimum of 20% and a maximum of 100% of the same LLDPE/butene copolymer component.

In one embodiment of the present invention, the co-extruded film structure is manufactured using a cast extrusion line in which the stretch film is extruded onto a cooled cast roller. In accordance with the invention, polymer composition for each layer, as described above, is fed through a blender or hopper to a series of extruders corresponding to each of the compositions. This blend of polymers is fed into 3 or 4 extruders and heated to a molten state in a manner consistent with conventional cast film co-extrusion processes. The stretch film of the invention can be manufactured by feeding polymer compositions for the various layers through the extruders at a combined rate of about 1000 to 2500 lbs./hr. (typical), under the following operating conditions:

| A/D | 375° F.–540° F. | 218.75–437.5 lbs./hr. |
| B Layer | 375° F.–540° F. | max. 1625 lbs./hr. |
| C Layer | 375° F.–540° F. | max. 437.5 lbs./hr. |

The molten polymer is then conveyed to a "feed-block" that combines the molten materials and maintains the multi-layered co-extruded structure. The five contiguously extruded layers are deposited onto a cooled casting roll to form the stretch film. The layers, each extruded through a slot die at up to 550° F., come into contact with a cast roll cooled to a temperature within an approximate range of 40° F. to 90° F. A vacuum box and static pinning system is used to pin the melt exiting the die opening to the casting roll. The thickness or gauge of the film, as measured from one planar surface to the other planar surface, can run from 0.50 mils to 1.50 mils. The film is drawn down to the final gauge by varying the ratio of line speed (take-up) to feed speed (extruded). The film is carried downstream through a series of idler rollers to the winder where the film is slit, in line, to the finished product width and length. Film widths can range from 2 to 30 inches. Width does not include core extension. Length can range from 200 to 10,000 feet.

The films of the present invention are used to hand wrap articles such canned goods, food products, paints, tiles, and the like, pet supplies, automotive supplies (parts, motor oils, etc.), can liner industry, paper products, irregularly shaped products, beverage containers, and beverage bottles. Hand wrapping operations are applied where machine wrapping is not practical or economical. The gauges for such materials typically range from 0.5 mil to 1.2 mil. The desirable physical properties of these products are good clarity (low haze), good puncture and tear resistance (across the web and machine direction), and good cling or cohesion properties.

The above represents part of the products wherein the present invention films are useful. Other stretch wrap applications will be apparent to those skilled in the art.

In accordance with an embodiment of the present invention, cling additives are added to one or both of the outer layers in order to enhance the cling force of the film. Various cling additives have been utilized in cling film applications. These additives have been used with resins not inherently possessing cling properties. In accordance with an embodiment of the present invention, a small amount of cling additive is added to either one or both of the outer layers in order to enhance existing cling properties. Non-limiting examples of cling additives include, for example, such tackifiers as polybutene and low molecular weight polyisobutylene, preferably between 200–3000, most preferably 200–300. Other suitable tackifiers include polyterpenes, amorphous polypropylene, ethylene vinyl acetate copolymers, microcrystalline wax, alkali metal sulfosuccinates, and mono-and di-glycerides of fatty acids, such as glycerol monostearate, glycerol monooleate, sorbitan monolaurate, sorbitan monopalmitate, sorbitan monostearate and sorbitan monooleate. Preferably, the tackifier is polybutene or polyisobutylenes (PIB). Such products are available from various vendors. For example, sells a suitable PIB product under the designation of H-300 or H-300H. Such products have a kinematic viscosity (ASTM D445, at 99° C. (210° F.)) of from 635 to 690 cSt. and a specific gravity (ASTM D1298 at 15.5° C. (60° F.)) of 0.893 to 0.910. Such cling agents are added in an amount from 0.1 to 2.0 percent by weight based on the total film weight. However, the cling additive is added only to one or both the outer layers. Preferred amounts of the cling additive range from 0.5 to 1.5 percent with 1.0 percent being most preferred.

The following components are shown as exemplary products used in each of the layers of the five layer film examples shown below. All the films shown below exhibited improved properties for their indicated field of use and as discussed above.

IT1 is a linear low-density polyethylene (LLDPE) product available from Exxon Chemical, Polymers Group. These products are linear low density-polyethylene/hexene copolymers having the following target properties. These products are FDA approved for food contact except for cooking. This product meets the requirements set forth above for the outer layer LLDPE-1.

| | IT1 | |
| --- | --- | --- |
| Melt Index | ASTM D-1238 (E) | 2.0 g/10 min. |
| Density | | 0.917 g/cc |
| Melting Point | | 255° F. (124° C.) |

Component IT5 is an LLDPE designed for blown film applications. These products are linear low density-polyethylene/butene copolymers. These products are available from various sources including Exxon Chemical and have the following properties. These products exhibit good tensile and toughness properties. These products are FDA approved for food contact at or below cooking temperatures. This product meets the requirements set forth above for the inner and core layer LLDPE components and the LLDPE-2 of the outer layers.

| 1T5 | | |
|---|---|---|
| Melt Index (g/10 min.) | 2.0 | D 1238 |
| Density (g/cc) | 0.918 | |
| Melting point | 249° F. (121° C.) | |

The following formulation was utilized to produce hand wrap products in various gauges in accordance with the present invention. Each of the film products represents a premium or heavy duty hand wrap stretch film product for commercial applications. The film products exhibited improved physical properties.

| Hand Wrap Film: All Gauges | | |
|---|---|---|
| LAYERS | % PER LAYER | RESIN |
| A-8.75% | 75.00% | IT1 |
| | 25.00% | IT5 |
| B-32.5% | 100% | IT5 |
| C-17.5% | 100% | IT5 |
| B-32.5% | 100% | IT5 |
| A or D-17.5% | 75.00% | IT1 |
| | 25.00% | IT5 |

As can be seen from the above, the five layer film comprises two outer layers, two inner layers, and a core layer. The outer layers comprise from about 10–20 percent of the overall film. The outer layers may be the same or different. The inner layers (as distinguished from the core layer) comprise from about 40–80% of the overall film. The inner layers may be the same or different. The core layer comprises from about 10–30% of the overall film.

The table below shows the physical properties of the 0.80 mil film shown above and produced in accordance with the present invention.

| TENSILE | | |
|---|---|---|
| Point at which film no longer behaves like a spring. | Tensile @ Yield (PSI) | |
| | MD | 1093 |
| | *MD @ 100% | 1618 |
| | TD | 1061 |
| ULTIMATE TENSILE (psi) | | |
| Maximum Tensile Stress | MD | 7013 |
| (Before breaking point) | TD | 3546 |
| ELONGATION @ YIELD % | | |
| increase in length at yield point. | MD | 8.2 |
| | TD | 8.1 |
| BREAK ELONGATION (%) | | |
| increase in length @ break point. (Higher number-greater stretch. | MD | 572 |
| | TD | 902 |
| 1% SECANT MODULUS (psi) | | |
| Measure of stiffness. | MD | 16514 |
| | TD | 17626 |
| ELMENDORF TEAR | | |

-continued

| Force required to tear film. | MD (g) | 47 |
|---|---|---|
| | MD (g/mil) | 59 |
| | TD (g) | 454 |
| | TD (g/mil) | 582 |
| DART DROP | | |
| Measure of impact resistance. | (g) | 73 |
| | (g/mil) | 94 |
| GUAGE MIC (mils) | | |
| Thickness of film. | Average | 0.78 |
| | Low | 0.76 |
| | High | 0.80 |
| PUNCTURE | | |
| Length of probe at 200% | Starting Prestretch % | 170 |
| | 3 INCH | P |
| LOAD RETENTION | | |
| Holding force. | Starting Prestretch % | 100 |
| | POUNDS | 28 |
| CLING | | |
| Measure of cling force. | Starting Prestretch % | 100 |
| | | 189 |
| PRE-STRETCH | | |
| Measure of stretch % before break occurs. | Average % | 376 |
| | Starting % | 250 |
| | Stretchforce (lbs) | 32 |

The data indicates that a film of the present invention exhibits a good balance of properties for the targeted applications.

While various examples have been given above to assist the illustration of the present invention, these examples are not intended to define the scope of the invention. As is clear to the person skilled in the art, various products and combinations of products are utilized in each of the layers within the limitations of the claims below.

What is claimed is:

1. A multi-layer film comprising at least
   a first outer layer comprising a blend of linear low density-polyethylene/hexene copolymers and linear low density-polyethylene/butene copolymers;
   a first inner layer comprising linear low density-polyethylene/butene copolymers;
   a core layer comprising linear low density-polyethylene/butene copolymers;
   a second inner layer comprising linear low density-polyethylene/butene copolymers; and
   a second outer layer comprising a blend of linear low density-polyethylene/hexene copolymers and linear low density-polyethylene/butene copolymers.

2. The multi-layer film of claim 1 where the same linear low density-polyethylene/butene copolymer is utilized in each of the layers.

3. The multi-layer film of claim 1 wherein the first and second inner layers are drawn from an extruder at a faster rate than the core layer and the outer layers.

4. A multi-layer film comprising at least
   from 4 to 13 percent by weight of a first outer layer comprising a blend of linear low density-polyethylene/hexene copolymers and linear low density-polyethylene/butene copolymers;
   from 20 to 40 percent by weight of a first inner layer comprising linear low density-polyethylene/butene copolymers from 10 to 30 percent by weight of a core layer comprising linear low density-polyethylene/butene copolymers;

from 20 to 40 percent by weight of a second inner layer comprising linear low density-polyethylene/butene copolymers; and from 4 to 13 percent by weight of a second outer layer comprising a blend of linear low density-polyethylene/hexene copolymers and linear low density polyethylene butene copolymers.

5. The multi-layer film of claim 4 where the same linear low density-polyethylene/butene copolymer is utilized in each of the layers.

6. The multi-layer film of claim 4 wherein the first and second inner layers are drawn from an extruder at a faster rate than the core layer and the outer layers.

7. A multi-layer film comprising from 4 to 13 percent by weight of a first outer layer comprising a blend of 60 to 90 percent by weight of a first linear low density polyethylene product, and 10 to 40 percent by weight of a second linear low density polyethylene product;

from 20 to 40 percent by weight of a first inner layer comprising linear low density-polyethylene/butene copolymer products;

from 10 to 30 percent by weight of a core layer comprising linear low density-polyethylene/butene copolymer products;

from 20 to 40 percent by weight of a second inner layer comprising linear low density-polyethylene/butene copolymer products; and from 4 to 13 percent by weight of a second outer layer comprising a blend of 60 to 90 percent by weight of a first linear low density polyethylene product, and 10 to 40 percent by weight of a second linear low density polyethylene product.

8. The multi-layer film of claim 7 where a linear low density-polyethylene/butene copolymer is utilized in each of the layers.

9. The multi-layer film of claim 7 wherein the first and second inner layers are drawn from an extruder at a faster rate than the core layer and the outer layers.

10. A multi-layer film comprising a first outer layer representing from 4 to 13 percent by weight of the film and comprising a blend of
70 to 80 percent by weight of linear low density-polyethylene/hexene copolymers having a melt index form 1.72 to 2.28 g/10 min. and a density from 0.915 to 0.9198 grams per cubic centimeter, and 20 to 30 percent by weight of linear low density-polyethylene/butene copolymer having a melt index from 1.72 to 2.28 g/10 min. and a density from 0.916 to 0.9198 grams per cubic centimeter;

a first inner layer representing from 30 to 35 percent by weight of the film and comprising linear low density-polyethylene/butene copolymer having a melt index from 1.72 to 2.28 g/10 min. and a density from 0.916 to 0.9198 grams per cubic centimeter;

a core layer representing from 15 to 20 percent by weight of the film comprising linear low density-polyethylene/butene copolymer having a melt index from 1.72 to 2.28 g/10 min. and a density from 0.916 to 0.9198 grams per cubic centimeter;

a second inner layer representing from 30 to 35 percent by weight of the film and comprising linear low density-polyethylene/butene copolymer having a melt index from 1.72 to 2.28 g/10 min. and a density from 0.916 to 0.9198 grams per cubic centimeter; and a second outer layer representing from 15 to 20 percent by weight of the film and comprising a blend of
70 to 80 percent by weight of linear low density-polyethylene/hexene copolymers having a melt index form 1.72 to 2.28 g/10 min. and a density from 0.915 to 0.9198 grams per cubic centimeter, and 20 to 30 percent by weight of linear low density-polyethylene/butene copolymer having a melt index from 1.72 to 2.28 g/10 min. and a density from 0.916 to 0.9198 grams per cubic centimeter.

11. The multi-layer film of claim 10 wherein the linear low density-polyethylene/butene copolymer in each layer is the same polymer having a melt index from 1.7 to 2.3 g/10 min. and a density of from 0.915 to 0.9198 grams per cubic centimeter.

12. The multi-layer film of claim 10 wherein the first and second inner layers are drawn from an extruder at a faster rate than the core layer and the outer layers.

* * * * *